United States Patent
Kumar et al.

(10) Patent No.: US 11,710,158 B2
(45) Date of Patent: Jul. 25, 2023

(54) VEHICLE DAMAGE ESTIMATION

(71) Applicant: Ford Global Technologies, LLC, Dearborn, MI (US)

(72) Inventors: Pankaj Kumar, Canton, MI (US); Avisek Naug, Nashville, TN (US); Imad Makki, Dearborn Heights, MI (US); Steven Joseph Szwabowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 16/750,815

(22) Filed: Jan. 23, 2020

(65) Prior Publication Data

US 2021/0232859 A1    Jul. 29, 2021

(51) Int. Cl.
G06Q 30/0283    (2023.01)
G06N 3/088    (2023.01)
G06V 10/44    (2022.01)
G06F 18/214    (2023.01)
G06F 18/2132    (2023.01)
(Continued)

(52) U.S. Cl.
CPC ....... *G06Q 30/0283* (2013.01); *G06F 18/214* (2023.01); *G06F 18/2132* (2023.01); *G06F 18/2193* (2023.01); *G06N 3/045* (2023.01); *G06N 3/088* (2013.01); *G06V 10/255* (2022.01); *G06V 10/44* (2022.01); *G06V 10/764* (2022.01); *G06V 10/774* (2022.01); *G06V 10/7796* (2022.01); *G06V 10/82* (2022.01); *G06V 20/20* (2022.01); *G06V 2201/08* (2022.01)

(58) Field of Classification Search
None
See application file for complete search history.

(56) References Cited

U.S. PATENT DOCUMENTS 9,886,771 B1    2/2018  Chen et al.
2008/0266396 A1*  10/2008  Stein ............... H04N 7/183
                                    348/148
(Continued)

FOREIGN PATENT DOCUMENTS

CN    108109137 A    6/2018
CN    109784171 A    5/2019
GB    2554361 A    4/2018

OTHER PUBLICATIONS

Demir, Ugur, and Gozde Unal. "Patch-based image inpainting with generative adversarial networks." arXiv preprint arXiv:1803.07422 (2018). (Year: 2018).*

(Continued)

*Primary Examiner* — David Perlman
(74) *Attorney, Agent, or Firm* — Frank A. MacKenzie; Bejin Bieneman PLC (57) ABSTRACT

A computer, including a processor and a memory, the memory including instructions to be executed by the processor to train a generative adversarial network (GAN) to reconstruct a missing portion of an image by determining a reconstructed portion of the image based on data from portions of the image surrounding the missing portion and compare an acquired image with the reconstructed portion of the image to determine a damaged portion. The instructions further include instructions to determine estimated damage based on the damaged portion.

20 Claims, 10 Drawing Sheets

(51) Int. Cl.
   *G06F 18/21*    (2023.01)
   *G06N 3/045*    (2023.01)
   *G06V 10/764*   (2022.01)
   *G06V 10/774*   (2022.01)
   *G06V 10/778*   (2022.01)
   *G06V 10/82*    (2022.01)
   *G06V 10/20*    (2022.01)
   *G06V 20/20*    (2022.01)

(56) References Cited

U.S. PATENT DOCUMENTS

| | | | |
|---|---|---|---|
| 2018/0260793 A1 | 9/2018 | Li et al. | |
| 2019/0355102 A1* | 11/2019 | Lin | G06T 5/005 |
| 2020/0364842 A1* | 11/2020 | Chaton | G06N 3/08 |
| 2020/0402178 A1* | 12/2020 | Brandmaier | H04N 5/232939 |
| 2021/0034961 A1* | 2/2021 | Lovell | G05B 19/4097 |
| 2021/0192629 A1* | 6/2021 | Tofte | G06T 7/75 |

OTHER PUBLICATIONS

Demir et al., "Patch-Based Image Inpainting with Generative Adversarial Networks", arXiv:1803.07422v1 [cs.CV] Mar. 20, 2018.
Miao et al., "Face Image Inpainting Algorithm Based on Generative Adversarial Network", 2019 6th International Conference on Information Science and Control Engineering (ICISCE), DOI: 10.1109/ICISCE48695.2019.00063.

* cited by examiner

VEHICLE DAMAGE ESTIMATION

BACKGROUND

Vehicles can be damaged in the course of operation. Vehicle damage can include minor scratches and dents occurring on vehicle body panels. Vehicle damage can be caused by contact with other vehicles or with other stationary and/or moving objects including barriers, railings, etc. while a vehicle is moving. Vehicle damage can also be caused by contact with moving vehicles and other moving objects even while a vehicle is parked.

DETAILED DESCRIPTION

Vehicles can be damaged. Vehicle damage can include minor scratches and dents occurring on vehicle body panels. Minor scratches and dents are defined herein as vehicle damage that can be visually discerned but that does not prevent a vehicle from operating normally. Current technology supports subjective assessments of vehicle damage, e.g., can provide an image for manual inspection and/or can perform image recognition to determine the possible existence of damage, but not its extent. For example, computing devices can be equipped with video cameras to acquire video image data regarding damaged vehicle body panels, however the amount of data to be acquired, transmitted, stored and recalled would be large, and requires a large amount of computing resources, network bandwidth. Further, software is lacking to track and interpret vehicle images to reliably and accurately retrieve and compare correct before-and-after-images relating to each vehicle use. Moreover, subjective assessments of vehicle damage are typically insufficient to determine vehicle damage with desired accuracy or reliability. There is room to provide a technical infrastructure to identify and assess vehicle damage, including the extent of damage and a user predicted to be responsible for the damage.

Techniques described herein improve damage assessment, both reliability and accuracy as well as efficiency of utilization of computing resources for minor damage to vehicle body panels by only requiring images of a vehicle after use to determine vehicle body panel damage. A described herein, a computer can determine damage to vehicle body panels by subtracting "after" images acquired after a vehicle use from "before" images acquired before the vehicle was used. This technique includes accurately aligning before and after images and further includes obtaining a set of before images and reproducing lighting and camera location to match the after images with before images. Matching images in the present context means that a second or reproduced image substantially duplicates the size, shape, color, and lighting of objects in a first image with size, shape, color, and lighting of objects in the second image. Matching can be determined by performing pixel-by-pixel subtraction of a first image from a second image to determine matching based on summing absolute differences between the two images. Images with a summed absolute difference that is substantially zero could be determined to match. Stored images of vehicles could be used as before images but would rely on properly identifying a make and model of the vehicle and reproducing the color, lighting, and camera location.

Figure 4:
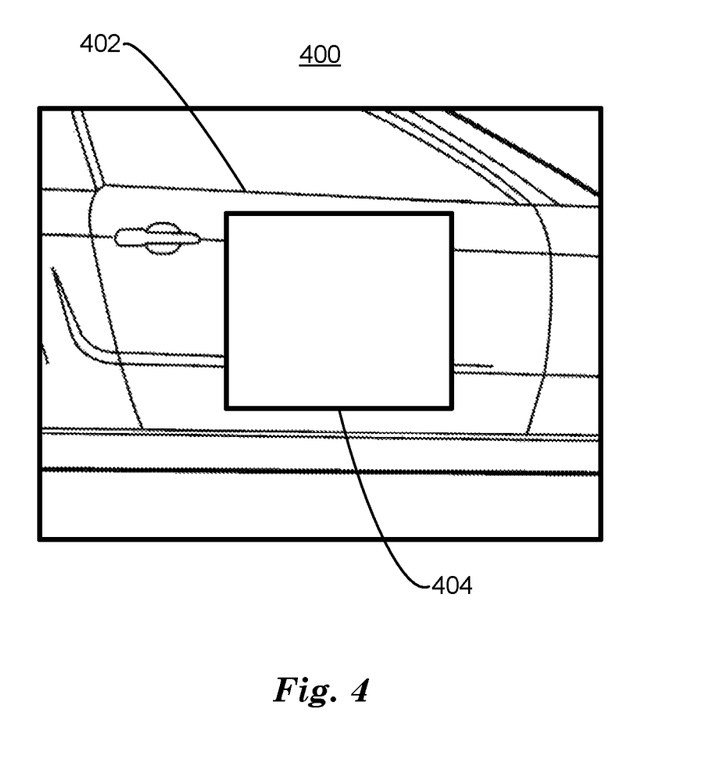
FIG. 4 is a diagram of an example vehicle panel with a missing portion.

Before and after images can be provided as input to a neural network. For example, techniques described herein mask an image of a body panel, reconstruct the masked portion 404 based on neural network processing and subtract the reconstructed image from an image of the vehicle after use. Minor (i.e., scratch and dent) damage to vehicle body panels can be identified from differences between the reconstructed image and the acquired image and can be evaluated based on a size and shape of an image difference to determine an extent of vehicle damage. In short, techniques described herein improve accuracy over other techniques by eliminating subjectivity in damage estimates, reducing camera lighting and location problems and reducing computer and network resources required for image comparison techniques.

Disclosed herein is a method including training a generative adversarial network (GAN) to reconstruct a missing portion of an image by determining a reconstructed portion of the image based on data from portions of the image surrounding the missing portion, comparing an acquired image with the reconstructed portion of the image to determine a damaged portion, and determining estimated damage based on the damaged portion. The instructions can include instructions to determine the estimated damage based on the size, shape, color, and location of the damaged portion. The estimated damage can include a recommended repair technique. The GAN can include a generative network that includes a first pipeline of convolutional layers followed by second and third parallel pipelines of encoding layers, followed by a fourth pipeline of combining convolutional layers. The GAN can include a discriminator network that includes two parallel pipelines including a global Wasserstein loss pipeline and a local Wasserstein loss pipeline. The GAN can be trained by combining local Wasserstein losses with global Wasserstein losses to determine weights for the discriminator network wherein Wasserstein losses are determined by calculating divergence for pixel probability distributions. Determining the reconstructed portion of the image can include first generating a coarse representation of the reconstructed portion of the image.

Determining the reconstructed portion of the image can further include refining the coarse representation of the reconstructed portion of the image by combining results of an attention encoder and a hallucination encoder applied to the coarse representation and inputting the refined result images to a generative network wherein the attention encoder is a first neural network that propagates relative locations of surrounding data into the reconstructed portion of the image and the hallucination encoder is a second neural network that propagates details of surrounding data into the reconstructed portion of the image. The generative network can include convolutional layers. The damage can be determined by performing pixel-wise subtraction of the reconstructed portion of the image from the image. A high pass filter can be applied to results of pixel-wise subtraction of the reconstructed portion of the image from the acquired image to retain high frequency differences. The high pass filter can include Canny edge detection. The missing portion of the image to reconstruct can be determined based on a plurality of missing portions of images. The estimated damage can be determined based on estimated damage data acquired from previously damaged vehicles.

Further disclosed is a computer readable medium, storing program instructions for executing some or all of the above method steps. Further disclosed is a computer programmed for executing some or all of the above method steps, including train a generative adversarial network (GAN) to reconstruct a missing portion of an image by determining a reconstructed portion of the image based on data from portions of the image surrounding the missing portion, compare an acquired image with the reconstructed portion of the image to determine a damaged portion, and determine estimated damage based on the damaged portion. The instructions can include instructions to determine the estimated damage based on the size, shape, color, and location of the damaged portion. The estimated damage can include a recommended repair technique. The GAN can include a generative network that includes a first pipeline of convolutional layers followed by second and third parallel pipelines of encoding layers, followed by a fourth pipeline of combining convolutional layers. The GAN can include a discriminator network that includes two parallel pipelines including a global Wasserstein loss pipeline and a local Wasserstein loss pipeline. The GAN can be trained by combining local Wasserstein losses with global Wasserstein losses to determine weights for the discriminator network wherein Wasserstein losses are determined by calculating divergence for pixel probability distributions. Determining the reconstructed portion of the image can include first generating a coarse representation of the reconstructed portion of the image.

The computer can be further programmed to determine the reconstructed portion of the image further including refining the coarse representation of the reconstructed portion of the image by combining results of an attention encoder and a hallucination encoder applied to the coarse representation and inputting the refined result images to a generative network wherein the attention encoder is a first neural network that propagates relative locations of surrounding data into the reconstructed portion of the image and the hallucination encoder is a second neural network that propagates details of surrounding data into the reconstructed portion of the image. The generative network can include convolutional layers. The damage can be determined by performing pixel-wise subtraction of the reconstructed portion of the image from the image. A high pass filter can be applied to results of pixel-wise subtraction of the reconstructed portion of the image from the acquired image to retain high frequency differences. The high pass filter can include Canny edge detection. The missing portion of the image to reconstruct can be determined based on a plurality of missing portions of images. The estimated damage can be determined based on estimated damage data acquired from previously damaged vehicles.

Figure 1:
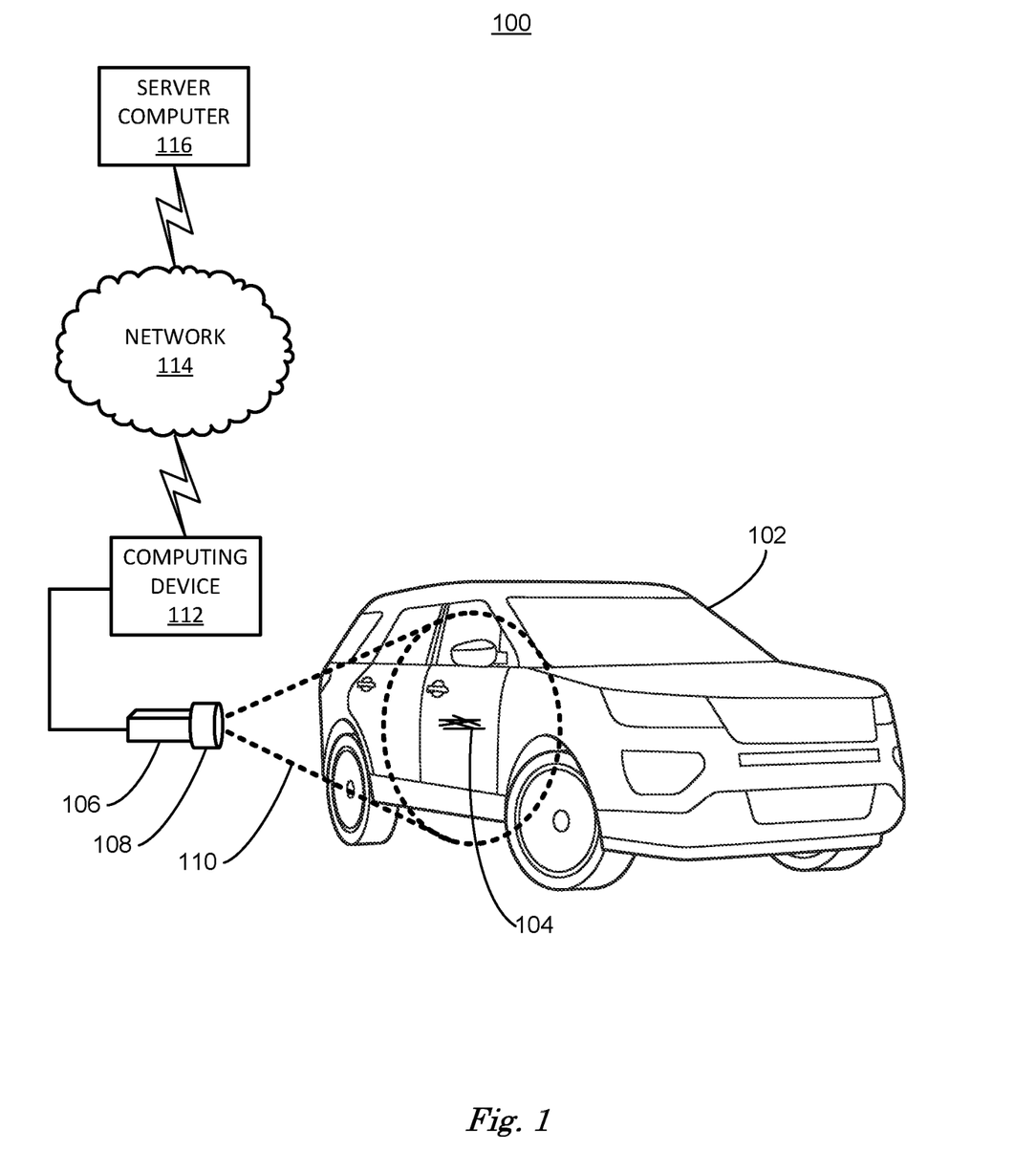
FIG. 1 is a diagram of an example computer imaging system.

FIG. 1 is a diagram of a computer imaging system 100. Computer imaging system 100 can be arranged to acquire image data of a vehicle 102, where the vehicle 102 can be an automobile, truck, airplane, boat, drone, robot, etc., or any other device that conveys, transports or moves by motive power. Vehicle 102 can include minor damage 104 to one or more body panels, where a body panel is defined as a contiguous portion of a vehicle's 102 outer surfaces or covering that form the overall shape of the vehicle. Vehicle body panels can be steel or plastic and are typically painted or coated. Computer imaging system 100 includes a camera 106 which can be a video camera and includes a lens 108 having a field of view 110. The field of view can be arranged to permit the camera 106 to acquire an image that includes the minor damage 104 on the vehicle 102. The camera 106 acquires image data within the field of view 110 including the minor damage 104 and communicates the image data to a computing device 112 via a wired or wireless connection.

The computing device 112 includes a processor and a memory such as are known. Further, the memory includes one or more forms of computer-readable media, and stores instructions executable by the processor for performing various operations, including as disclosed herein. For example, the computing device 112 may include programming to acquire image data from one or more cameras 106 via an interface. The computing device 112 can additionally or alternatively include wired or wireless communication mechanisms such as are known, e.g., Ethernet or other communication protocols. The computing device 112 can use these communications mechanisms to communicate with a remote server computer 1116, e.g., a cloud server, via a network 114, which, as described below, includes hardware, firmware, and software that permits computing device 115 to communicate with a remote server computer 116 via a network 114 such as wireless Internet (WI-FI®) or cellular networks. The computing device 112 also includes nonvolatile memory such as is known. Computing device 112 can log data by storing the data in nonvolatile memory for later retrieval and transmittal via the network 114 to a server computer 116.

Figure 2:
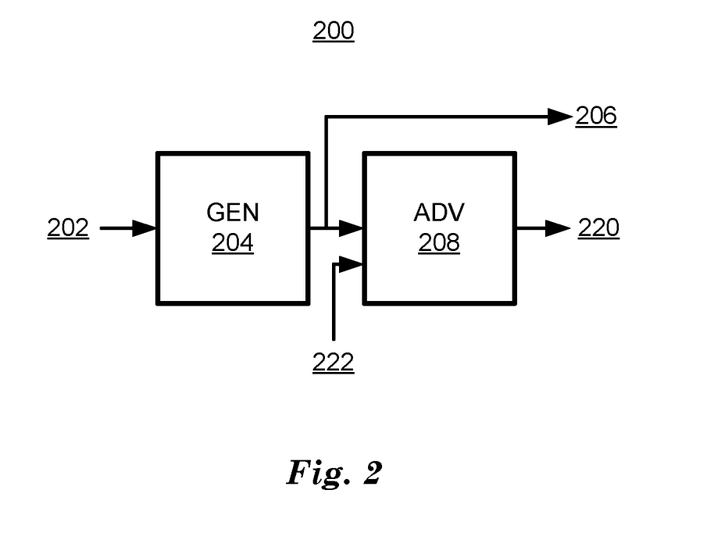
FIG. 2 is a diagram of an example generative adversarial network.

FIG. 2 is a diagram of a generative adversarial network (GAN) 200. A GAN 200 is a software program that executes on a computing device 112 or server computer 116. A GAN 200 receives as input an image 202, in this example an image 202 of a vehicle body panel. The generative network (GEN) 204 is a neural network that "inpaints" a masked off portion of the image 202 by forming pixel data to replace the zeros based on pixel data surrounding the masked off portion. Inpainting means replacing missing pixel data with pixel data determined by surrounding, non-missing pixel data. In operation, the generative network 204 can input an image 202 including a masked off portion including missing data and outputs a reconstructed image 206 where the zeros of the masked off portion are replaced with pixel values that simulate an image of an undamaged vehicle body panel. Details regarding the operation of a generative network 204 are given in relation to FIG. 7, below.

To train the generative network 204, that receives as input the reconstructed image 206 is passed to an adversarial network 208 that receives as input the reconstructed image 206 and determines whether the reconstructed image 206 accurately simulates an image of an undamaged vehicle body. The adversarial network 208 in turn can be trained to make this determination by using real images 222 of undamaged vehicle body panels prior to receiving as input reconstructed images 206. The adversarial network 208 outputs an output loss 210 that measures how closely the reconstructed image 106 matches a real image 212 of a vehicle body panel. At training time, the output loss 210 is backpropagated to the generative network 204 to provide feedback on how closely a reconstructed image 206 generated by generative network 204 duplicates a real image 212 of an undamaged vehicle body panel. Details of the operation of an adversarial network are given in relation to FIG. 8, below.

Figure 3:
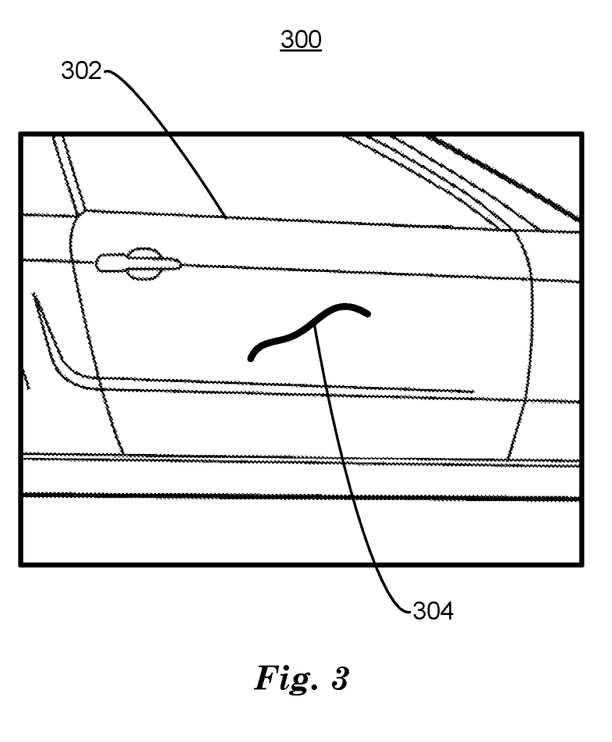
FIG. 3 is a diagram of an example vehicle panel with damage.

FIG. 3 is a diagram of an image 300 of a portion of a vehicle including a vehicle body panel 302, in practice a color image but here rendered in black and white to comply with Patent Office regulations. The vehicle body panel 302, in this example a vehicle door, can be a portion of a vehicle. Vehicle body panel 302 includes a damaged portion 304 which can be a dent or a scratch, for example.

FIG. 4 is diagram of an image 400 of a portion of a vehicle including a vehicle body panel 402, in practice a color image but here rendered in black and white to comply with Patent Office regulations. The vehicle body panel 402 includes a masked portion 404, which masks off a portion of image 400, within which the pixel data of the image 400 is set to zero. The masked portion 404 of image 400 can be, in addition to zero, some other pixel value designated to correspond to missing data, for example NULL or −1. An image 400 of a portion of a vehicle can include a plurality of possible masked portions 404 which cover a plurality of different portions of image 400 at different sizes. Prior to inputting image 400 to a GAN 200 to determine damage, a mask 404 can be selected from the plurality of masked portions 404 to cover the damaged portion 304 completely while minimizing the size of the masked portion 404.

Figure 5:
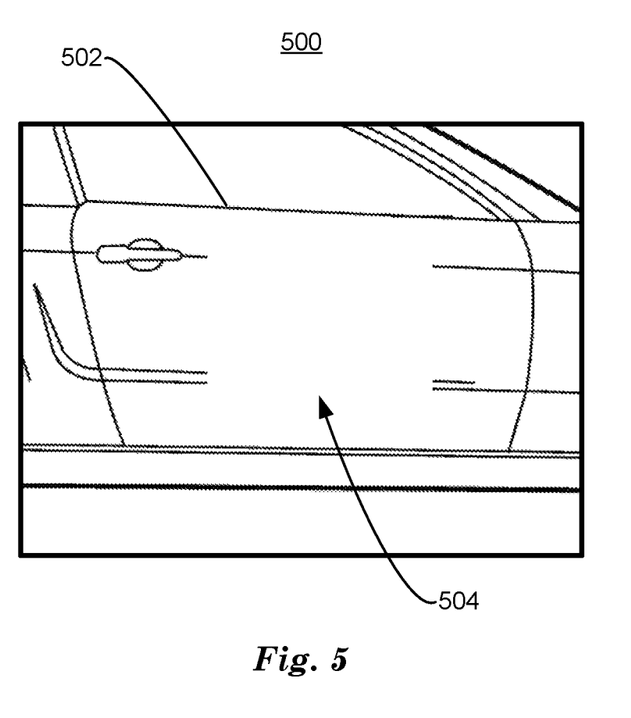
FIG. 5 is a diagram of an example vehicle panel with a missing portion including coarse filling.

FIG. 5 is diagram of an image 500 of a portion of a vehicle including a vehicle body panel 502, in practice a color image but here rendered in black and white to comply with Patent Office regulations. The vehicle body panel 502 includes a coarsely inpainted portion 504. Vehicle body panel 502 can be coarsely inpainted by convolutional encoder (CONV) 804 of generative network 1204 as described in relation to FIG. 8, below. Coarse inpainting is a process by which convolutional encoder 804 of generative network 204 replace zero pixel values in a masked portion 404 of an image 500 with non-zero pixel values from pixels surrounding the masked portion. Pixel values from pixels surrounding the masked portion 404 can be replicated from the outside edges of the masked portion to the center of the masked portion 404 while averaging the pixel values to provide a smooth transition of colors by convolutional encoder 804 of generative network 204.

Figure 6:
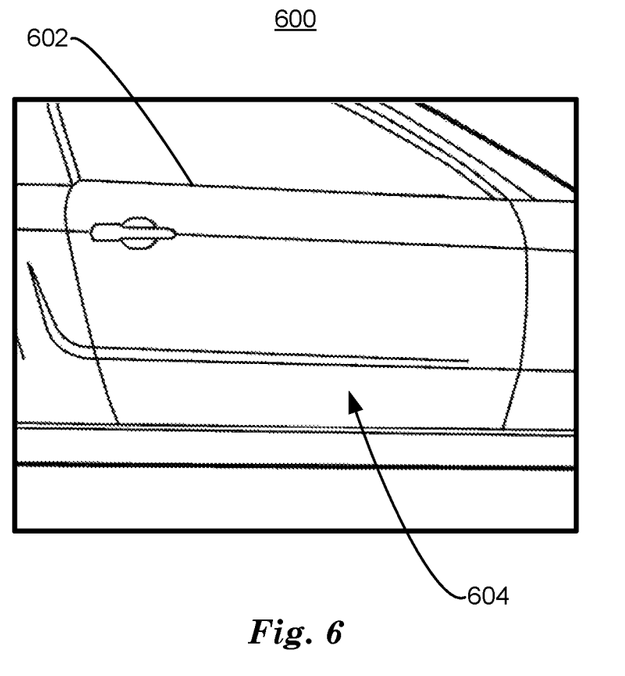
FIG. 6 is a diagram of an example vehicle panel with a missing portion including detailed filling.

FIG. 6 is diagram of an image 600 of a portion of a vehicle including a vehicle body panel 602, in practice a color image but here rendered in black and white to comply with Patent Office regulations. The vehicle body panel 602 includes a reconstructed portion 604 based on refined inpainting. Refined inpainting is a process that renders details and structure from regions of the image 600 surrounding a masked portion 404 onto a coarsely inpainted portion 504 from image 500 in FIG. 5, above. As described further below in relation to FIG. 8, refined inpainting is performed by attention encoder (AE) 808, hallucination encoder (HE) 810, and combining encoder (COMB) 814 of generative network 204. Attention encoder 808 propagates image details from surrounding portions of the image 600 around a coarsely inpainted portion 504 into the coarsely inpainted portion 504 to create a reconstructed portion 604. Hallucination encoder 810 generates image details based on trained image details and relative locations in the coarsely inpainted portion 504.

The attention encoder 808 is trained at training time to copy image detail from regions of an image 600 surrounding a coarsely inpainted portion 504. The hallucination encoder 810 generates detail that does not occur in regions of an image 600 surrounding a coarsely inpainted portion 504. The hallucination encoder 810 generates detail by performing dilations on each layer of an image 600, where the layers correspond to colors in a red-green-blue (RGB) encoded color image. Dilation is an image processing operation that performs non-linear convolution to expand pixel values into neighboring pixels surrounding a pixel based on logical tests between a pixel and its neighbors. A logical test, for example, can be: is a pixel "greater than", "less than", or "equal to" its neighbors. Following processing by the attention encoder 808 and the hallucination encoder 810, intermediate refined result images 812 are combined by combining encoder 814 to form an reconstructed image 206 including a reconstructed portion 604. The image 600 will including a reconstructed portion 604 will correspond to an image of an undamaged vehicle panel.

Figure 7:
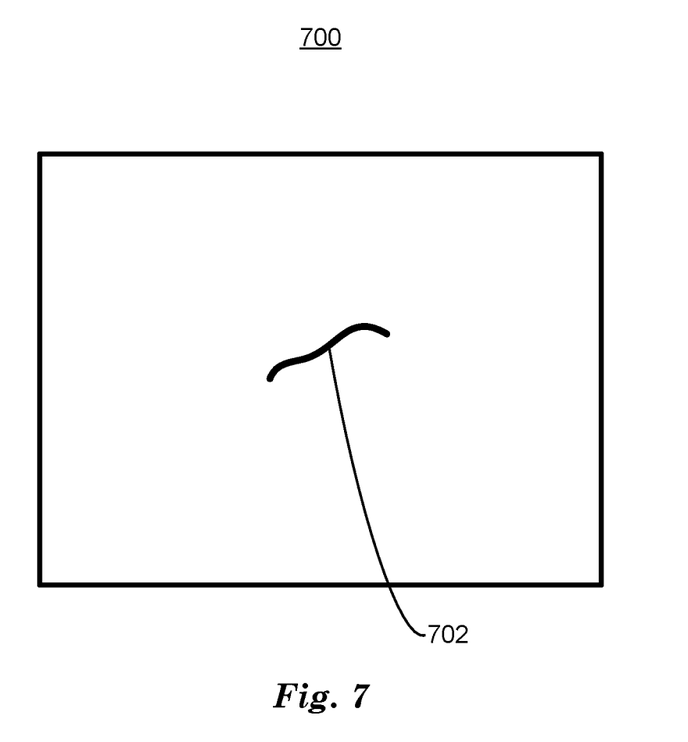
FIG. 7 is a diagram of example vehicle damage.

FIG. 7 is diagram of an image 700 including an isolated damaged portion 702, in practice a color image but here rendered in black and white to comply with Patent Office regulations. 700 can be formed by subtracting image 600, including a reconstructed portion 604, from image 300, including a damaged portion 304 by pixel-wise subtraction. Because image 600 including a reconstructed portion 604 includes a body panel 602 that corresponds to the appearance of the body panel 302 without damage, subtracting image 300 from image 600 leaves only an isolated damaged portion 702 similar in size, shape, and location to the damaged portion 302 in image 300. Isolated damaged portion 702 is referred to as "isolated" because it appears in image 700 without any surrounding vehicle body panel data. The extent of isolated damaged portion 702 can be determined based on the size and shape of the isolated damaged portion 702 based on empirical data regarding repair costs compared to size, shape and location of the isolated damaged portion 702 with respect to the body panel 302.

Determining an extent of damage based on the size, shape, and location of the isolated damaged portion 702 can be improved by boosting the image 700 by performing a high pass filter on the image 700. High spatial frequency data in image 700 tends to be based on damage and missing features from the inpainting steps. Low spatial frequency data tends to be based on textural differences between real video data and inpainted video data. A high pass filter is a spatial filter that retains high frequency differences in the isolated damaged portion 702 while rejecting low frequency differences. An example of a high pass filter can be an edge detection algorithm, for example Canny edge detection. A high pass filter retains or passes through the filter portions of the image 700 where the pixel values are changing rapidly. Following filtering with a high pass filter, the image 700 can be thresholded to eliminate low frequency structures and retain high frequency structures.

The strength of the high pass filter and the threshold value can be determined empirically. For example, sample images that include damaged portions can be filtered with a high pass filter while adjusting the high pass filter to change the frequency at which contents of the sample images are admitted. The results can be examined and the frequency at which damaged portions of the image are passed and non-damaged portions are filtered out can be selected as the frequency at which to separate the pass/no pass portions of the high pass filter. Following selection of the frequency, the sample images can be thresholded. To "threshold" an image means, in the present context, that the image retains all pixels with a pixel value greater than or equal to a threshold, and all pixels with a pixel value less than the threshold are set to a pixel value of zero. A threshold can be selected empirically by thresholding sample images with a plurality of threshold values and selecting a threshold value of the plurality of threshold values that retains most of the damaged portions of filtered sample images while setting to zero most of the pixels corresponding to undamaged or background pixels.

Figure 8:
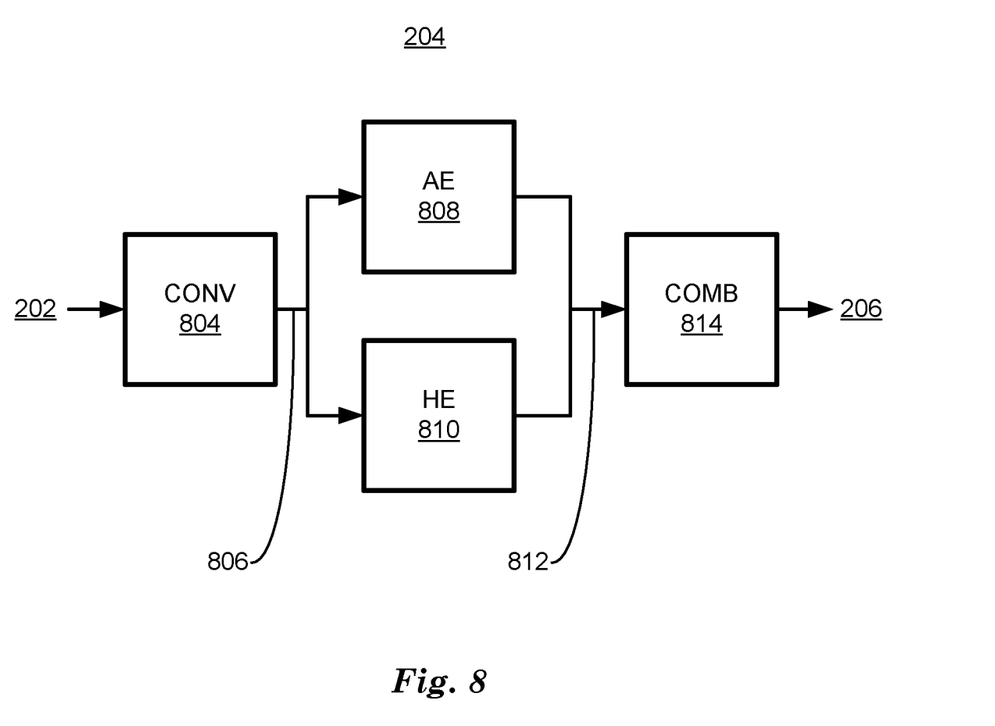
FIG. 8 is a diagram of an example generative neural network.

FIG. 8 is a diagram of a generative network 204. As discussed in relation to FIGS. 1, 4 and 5, a generative network 204 can be trained to input a masked input image 202 and to output an output image 210 that corresponds to an image of a complete, undamaged vehicle panel. Generative network 204 includes a first pipeline that includes a convolutional encoder 804 followed by second and third parallel pipelines that include an attention encoder 808 and a hallucination encoder 810, followed by a fourth pipeline that includes a combining encoder 814. The first pipeline includes a convolutional encoder 804 that generates a coarsely inpainted portion 504 as a coarse representation of a vehicle body panel 502. Generating the coarsely inpainted portion 504 includes processing the input image 202 with a series of convolutional layers that duplicates and smooths pixel values from pixels surrounding a masked portion 404. The convolutional encoder 804 reproduces pixel data from the edges of the masked portion 404 to the center of the masked portion 404 to produce a coarse intermediate result 806. The convolutional encoder 804 can also smooth the pixel data as it is generated to fill the masked portion 404.

Coarse intermediate result 806 is duplicated and input to second and third parallel pipelines including attention encoder 808 and hallucination encoder 810. As discussed above in relation to FIG. 6, above, attention encoder 808 is trained at training time to propagate image details from regions surrounding the masked portion 404 into the masked portion 404 to preserve image detail continuity between the masked portion 404 and non-masked portion surrounding the masked portion 404. Hallucination encoder 810 is trained at training time to generate image details that begin and end within the masked region and do not propagate from regions surrounding the masked portion 404.

Intermediate refined result images 812 from both the attention encoder 808 and the hallucination encoder 810 are input to a fourth pipeline of combining encoder 814. The combining encoder 814 includes combining convolutional layers that combine the two intermediate refined result images 812 into a single reconstructed image 206. The combining encoder 814 compares each pixel of the intermediate refined result images 812 from both the attention encoder 808 and the hallucination encoder 810 to determine the value of the pixel at that location of the output image 210. If the pixels from each intermediate refined result images 812 are equal to the value of the coarse intermediate result 806, the value of the coarse intermediate pixel is used as the output. If either of the intermediate refined result images 812 differ from the coarse intermediate result, the pixel value from the intermediate refined result is used. If both intermediate refined result images 812 differ from the coarse intermediate pixel, an average of the pixel values from the intermediate refined results can be used.

Figure 9:
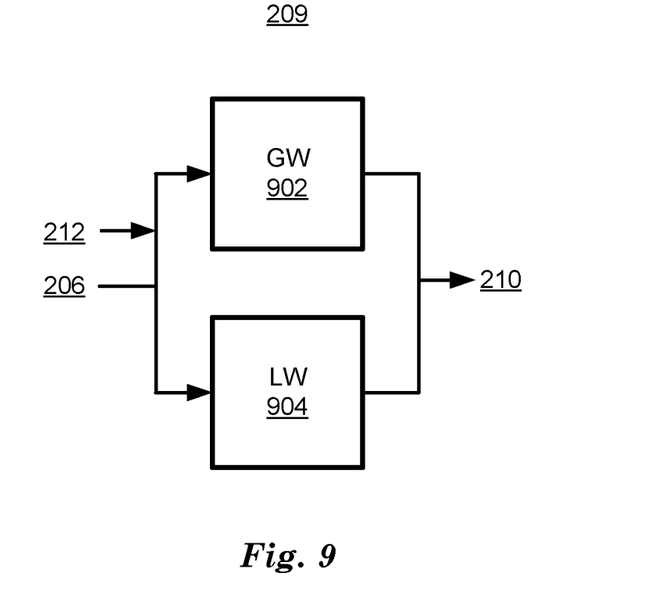
FIG. 9 is a diagram of an example adversarial neural network.

FIG. 9 is a diagram of an adversarial network 208. Adversarial network 208 is a discriminator network that includes two parallel pipelines, including a global Wasserstein loss pipeline and a local Wasserstein loss pipeline. A Wasserstein loss pipeline is a series of computational nodes that calculates a Wasserstein loss function on pixels of an image. A Wasserstein loss function, as is known, compares the probability distribution of pixel values in an input image to a probability distribution of pixel values based on a plurality of previously input images, i.e. a plurality of real training images 212. At training time, the reconstructed image 206 is input to adversarial network 208 to determine how closely a reconstructed image 206 output from a generative network 204 resembles a real image of an undamaged vehicle body panel. Prior to training time, the adversarial network 208 is pre-trained by inputting a plurality of real images 212 of undamaged vehicle body panels to both global Wasserstein loss layers (GW) 902 and local Wasserstein loss layers (LW) 904. Both global and local Wasserstein loss layers 902, 904 calculate divergence of pixel probability distributions. Pixel probability distributions are determined by calculating a histogram of pixel values and then measuring a mean and standard deviation for the distribution corresponding to the histogram data. Divergence of pixel probability distributions can be determined by measuring the amount of data that would have to change to make a first probability distribution have the same mean and standard deviation as a second probability distribution, for example.

A global Wasserstein loss layer 902 calculates the pixel distributions over the entire input image and measures the divergence of the calculated pixel distributions to the pixel distribution of the plurality of real images 212. A local Wasserstein loss layer 904 calculates pixel distributions over a plurality of equally sized neighborhoods and forms an average divergence from the pixel value distribution of a corresponding plurality of equally sized neighborhoods from the plurality of real images 212. Based on the divergence measures, weights are applied to the global and local Wasserstein loss values prior to combining them. The adversarial network 208 sums the weighted global and local Wasserstein loss values calculated by global Wasserstein loss layers 902 and local Wasserstein loss layers 904 to form an output loss 210 to be back propagated to the generative network 204 to determine a loss function that corresponds to how well the pixel statistics of the reconstructed image 206 matches the pixel statistics of real input images 212 of undamaged body panels at training time.

Figure 10:
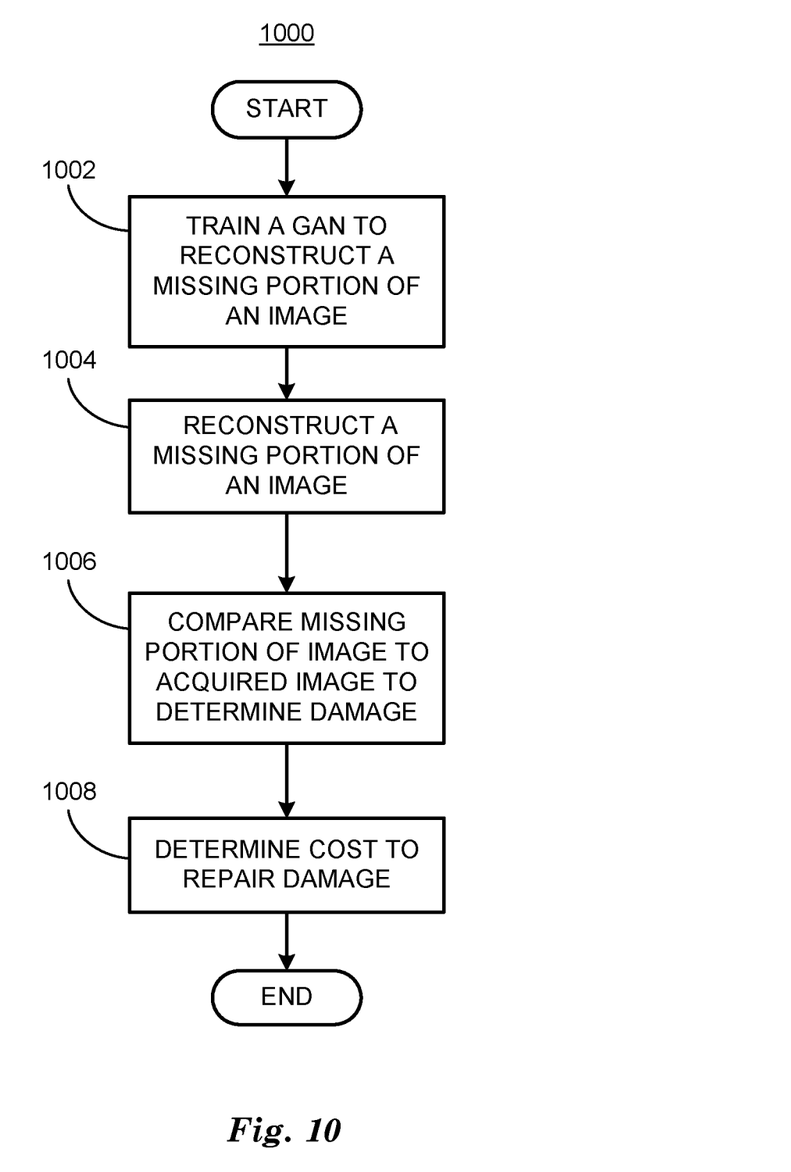
FIG. 10 is a flowchart diagram of an example process to determine vehicle damage with a generative adversarial network.

FIG. 10 is a flowchart diagram of a process 1000 described in relation to FIGS. 1-9, of a process 1000 for determining an estimated cost to repair based on reconstructing a missing portion of an image of a vehicle body panel. Process 1000 can be implemented by a processor of computing device, taking as input information from sensors, and executing commands, and outputting object information, for example. Process 1000 includes multiple blocks that can be executed in the illustrated order. Process 1000 could alternatively or additionally include fewer blocks or can include the blocks executed in different orders.

Process 1000 begins at block 1002, where a computing device trains a GAN 100 to reconstruct a missing portion of an image of a vehicle body panel. The GAN 100 can be trained using real video images of intact body panels as discussed in relation to FIG. 9, above.

At block 1004 a computing device inputs an image 400 of a body panel including a mask 404 that masks off a portion of the image by setting the pixel values to zero to the trained GAN 200. The trained GAN 200 outputs an image 600 with the masked off portion replaced with a reconstructed portion 604 of the vehicle body panel 602 based on inpainting techniques discussed in relation to FIGS. 5, 6, 8 and 9, above. Inpainting, as explained above, is a technique for reconstructing missing portions of image pixel data by introducing surrounding image pixel data into the missing portions of the image and generating image details.

At block 1006 a computing device compares an image 600 including a reconstructed portion 604 to an image 300 of a vehicle body panel 302 including a damaged portion 304. The computing device can subtract the image 600 from the image 300, for example, to leave an image 700 with non-zero pixels corresponding to the size, shape, color and location of the damaged portion 702 as discussed above in relation to FIG. 7.

At block 1008 a computing device can determine an estimated damage based on the damaged portion 702 determined at block 1006 based on comparison of the damaged portion 702 with empirically determined damage estimates. The size, shape, color and location of the damaged portion 702 with respect to a vehicle body panel 302 can be used to estimate damage to a body panel based on empirically determined damage estimates acquired from previously damaged vehicles. For example, if the color of the damaged portion 702 is the same as the color of the surrounding body panel, and the shape of the damaged portion 702 does not include sharp edges or straight lines, the damaged portion 702 can correspond to a dent that can be repaired without repainting the body panel. If the color of the damaged portion 702 includes changes in color the damaged portion 702 and the shape of the damaged portion 702 includes sharp edges and straight lines, damaged portion 702 can correspond to one or more scratches that would require repairing and repainting the body panel. The size of the damaged portion 702 can be compared to the size of the body panel. Vehicle damage that would require removing or replacing the entire body panel can be determined by placing an upper limit on the percentage of the area of the vehicle body panel included in the damaged portion 702. In examples where the size of the damaged portion 702 is a large percentage (>50%) of the body panel, replacing the body panel can be the easier than repairing the damaged portion 702. The location of the damaged portion 702 with respect to the vehicle body panel can also be used to determine whether damaged portion 702 is repairable. For example, damage in some locations of vehicle body panels might not be repairable and would require replacement of the entire vehicle body panel.

Empirical data regarding damage estimates based on size, shape, color and location of damaged portions 702 of vehicles, along with image data regarding the damaged portions 702 can be compiled and stored in a database on a server computer 116. When a damaged portion 702 of a vehicle is determined by techniques described above in relation to FIGS. 1-9, the data regarding the size, shape, color, and location of the damaged portion 702 can be compared to the database of damage estimates stored on a server computer 116 to generate a estimated damage for damaged portion 702. The damage estimate can include data regarding a recommended repair technique for a damaged portion 702, including whether repainting is required. The recommended repair technique can include a recommendation to replace the body panel rather than repair the body panel. The damage estimate can also include an estimate of a cost to repair the body panel. Following block 908 process 900 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A computer, comprising a processor; and
   a memory, the memory including instructions executable by the processor to:

determine a missing portion of an image by determining a damaged portion of an image;
train a generative adversarial network (GAN) to reconstruct the missing portion of the image by determining a reconstructed portion of the image based on data from portions of the image surrounding the missing portion, wherein the GAN includes a discriminator network that includes two parallel pipelines including a global Wasserstein loss pipeline and a local Wasserstein loss pipeline;
compare an acquired image with the reconstructed portion of the image to determine a damaged portion; and
determine estimated damage based on an isolated image of the damaged portion generated by performing pixel-wise subtraction of the reconstructed portion of the image from the image, wherein the reconstructed portion of the image was determined independent of data identifying a make, model, and color of a vehicle, and independent of lighting and camera location of the image.

2. The computer of claim 1, the instructions including instructions to determine the estimated damage based on the size, shape, color, and location of the damaged portion.

3. The computer of claim 1, wherein the estimated damage includes a recommended repair technique.

4. The computer of claim 1, wherein the GAN includes a generative network that includes a first pipeline of convolutional layers followed by second and third parallel pipelines of encoding layers, followed by a fourth pipeline of combining convolutional layers.

5. The computer of claim 1, the instructions including further instructions to train the GAN by combining local Wasserstein losses with global Wasserstein losses to determine weights for the discriminator network wherein Wasserstein losses are determined by calculating divergence for pixel probability distributions.

6. The computer of claim 1, wherein determining the reconstructed portion of the image includes first generating a coarse representation of the reconstructed portion of the image.

7. The computer of claim 6, wherein determining the reconstructed portion of the image further includes refining the coarse representation of the reconstructed portion of the image by combining results of an attention encoder and a hallucination encoder applied to the coarse representation and inputting the refined result images to a generative network wherein the attention encoder is a first neural network that propagates relative locations of surrounding data into the reconstructed portion of the image and the hallucination encoder is a second neural network that propagates details of surrounding data into the reconstructed portion of the image.

8. The computer of claim 1, the instructions further including instructions to apply a high pass filter to results of pixel-wise subtraction of the reconstructed portion of the image from the acquired image to retrain high frequency differences.

9. The computer of claim 8, wherein the high pass filter includes Canny edge detection.

10. The computer of claim 1, wherein the missing portion of the image to reconstruct is determined based on a plurality of missing portions of images.

11. The computer of claim 1, wherein estimated damage is determined based on estimated damage data acquired from previously damaged vehicles.

12. The computer of claim 1, wherein determining estimated damage based on the damaged portion by performing pixel-wise subtraction of the reconstructed portion of the image from the image reduces computer resources and network resources required for image comparison techniques.

13. A method, comprising:
determining a missing portion of an image by determining a damaged portion of an image;
training a generative adversarial network (GAN) to reconstruct the missing portion of the image by determining a reconstructed portion of the image based on data from portions of the image surrounding the missing portion, wherein the GAN includes a discriminator network that includes two parallel pipelines including a global Wasserstein loss pipeline and a local Wasserstein loss pipeline;
comparing an acquired image with the reconstructed portion of the image to determine a damaged portion; and
determining estimated damage based on an isolated image of the damaged portion generated by performing pixel-wise subtraction of the reconstructed portion of the image from the image, wherein the reconstructed portion of the image was determined independent of data identifying a make, model, and color of a vehicle, and independent of lighting and camera location of the image.

14. The method of claim 13, the instructions including instructions to determine the estimated damage based on the size, shape, color, and location of the damaged portion.

15. The method of claim 13, wherein the estimated damage includes a recommended repair technique.

16. The method of claim 13, wherein the GAN includes a generative network that includes a first pipeline of convolutional layers followed by second and third parallel pipelines of encoding layers, followed by a fourth pipeline of combining convolutional layers.

17. The method of claim 13, further comprising training the GAN by combining local Wasserstein losses with global Wasserstein losses to determine weights for the discriminator network wherein Wasserstein losses are determined by calculating divergence for pixel probability distributions.

18. The method of claim 13, wherein determining the reconstructed portion of the image includes first generating a coarse representation of the reconstructed portion of the image.

19. The method of claim 13, wherein determining estimated damage based on the damaged portion by performing pixel-wise subtraction of the reconstructed portion of the image from the image reduces computer resources and network resources required for image comparison techniques.

20. The computer of claim 18, wherein determining the reconstructed portion of the image further includes refining the coarse representation of the reconstructed portion of the image by combining results of an attention encoder and a hallucination encoder applied to the coarse representation and inputting the refined result images to a generative network wherein the attention encoder is a first neural network that propagates relative locations of surrounding data into the reconstructed portion of the image and the hallucination encoder is a second neural network that propagates details of surrounding data into the reconstructed portion of the image.

\* \* \* \* \*

UNITED STATES PATENT AND TRADEMARK OFFICE
CERTIFICATE OF CORRECTION

PATENT NO. : 11,710,158 B2
APPLICATION NO. : 16/750815
DATED : July 25, 2023
INVENTOR(S) : Pankaj Kumar et al.

It is certified that error appears in the above-identified patent and that said Letters Patent is hereby corrected as shown below:

In the Claims

Column 11, Line 57 Claim 8:    Change "retrain" to --retain--.

Signed and Sealed this
Twenty-second Day of August, 2023

Katherine Kelly Vidal
*Director of the United States Patent and Trademark Office*